US012608190B2

(12) United States Patent
Kato

(10) Patent No.: US 12,608,190 B2
(45) Date of Patent: Apr. 21, 2026

(54) VEHICLE SOFTWARE UPDATE APPARATUS

(71) Applicant: SUBARU CORPORATION, Tokyo (JP)

(72) Inventor: Hideaki Kato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 188 days.

(21) Appl. No.: 18/483,744

(22) Filed: Oct. 10, 2023

(65) Prior Publication Data

US 2024/0143309 A1 May 2, 2024

(30) Foreign Application Priority Data

Oct. 26, 2022 (JP) .................................. 2022-171717

(51) Int. Cl.
| | |
|---|---|
| *G06F 9/445* | (2018.01) |
| *B60W 50/06* | (2006.01) |
| *G06F 8/65* | (2018.01) |

(52) U.S. Cl.
CPC .............. *G06F 8/65* (2013.01); *B60W 50/06* (2013.01)

(58) Field of Classification Search
CPC . H04L 2209/84; H04L 67/104; H04L 1/1854; H04W 4/40; H04W 4/44; H04W 4/80; H04W 4/70; H04W 4/46; G06F 8/65; G06F 2211/005; G06F 8/61; G06F 8/60;

G06F 16/2379; G06F 16/23; G06F 8/658; G06F 8/71; G06F 30/15; G06F 2209/541; G06F 2209/544; B60W 50/06
See application file for complete search history.

(56) References Cited

U.S. PATENT DOCUMENTS

| | | | | | |
|---|---|---|---|---|---|
| 2019/0259223 A1* | 8/2019 | Sangameswaran | .. | G07C 5/0841 |
| 2023/0077561 A1* | 3/2023 | Jackson | ............... | G05D 1/0016 |
| | | | | 340/5.72 |

FOREIGN PATENT DOCUMENTS

| | | |
|---|---|---|
| JP | 2017-97620 A | 6/2017 |
| JP | 2018-86894 A | 6/2018 |
| JP | 2021-128362 A | 9/2021 |

* cited by examiner

*Primary Examiner* — Chuck O Kendall
(74) *Attorney, Agent, or Firm* — Rimon P.C.

(57) ABSTRACT

A vehicle software update apparatus includes an update control device, an input and output control device, and a communication control device. Before performing a process of updating software of a vehicle, the update control device: determines whether an administrator is on board the vehicle; outputs, via the input and output control device, a guidance notification of the software update process for the vehicle from an output device provided in the vehicle, upon a determination that the administrator is on board; and outputs, via the communication control device, the guidance notification of the software update process for the vehicle from a terminal device of the administrator of the vehicle, upon a determination that the administrator is not on board. The update control device performs the process of updating the software of the vehicle, after outputting the guidance notification of the software update process for the vehicle.

16 Claims, 11 Drawing Sheets

VEHICLE SOFTWARE UPDATE APPARATUS

CROSS-REFERENCE TO RELATED APPLICATIONS

The present application claims priority from Japanese Patent Application No. 2022-171717 filed on Oct. 26, 2022, the entire contents of which are hereby incorporated by reference.

BACKGROUND

The disclosure relates to a vehicle software update apparatus.

Japanese Unexamined Patent Application Publication (JP-A) Nos. 2021-128362, 2018-86894, and 2017-97620 disclose techniques of, when updating software to be used in a vehicle, notifying an occupant of the vehicle of the update.

SUMMARY

An aspect of the disclosure provides a vehicle software update apparatus to be applied to a vehicle. The vehicle software update apparatus includes an update control device, an input and output control device, and a communication control device. The update control device is configured to perform a process of updating software of the vehicle as a software update process. The input and output control device is configured to control an output device provided in the vehicle. The communication control device is configured to communicate with a terminal device of an administrator of the vehicle. The update control device is configured to, before performing the process of updating the software of the vehicle: perform a boarding determination process of determining whether the administrator is on board the vehicle; output, via the input and output control device, a guidance notification of the software update process for the vehicle from the output device provided in the vehicle, when the update control device determines that the administrator is on board in the boarding determination process; and output, via the communication control device, the guidance notification of the software update process for the vehicle from the terminal device of the administrator of the vehicle, when the update control device determines that the administrator is not on board in the boarding determination process. The update control device is configured to perform the process of updating the software of the vehicle, after outputting the guidance notification of the software update process for the vehicle.

An aspect of the disclosure provides a vehicle software update apparatus to be applied to a vehicle. The vehicle software update apparatus includes first circuitry, second circuitry, and third circuitry. The first circuitry is configured to perform a process of updating software of the vehicle as a software update process. The second circuitry is configured to control an output device provided in the vehicle. The third circuitry is configured to communicate with a terminal device of an administrator of the vehicle. The first circuitry is configured to, before performing the process of updating the software of the vehicle: perform a boarding determination process of determining whether the administrator is on board the vehicle; output, via the second circuitry, a guidance notification of the software update process for the vehicle from the output device provided in the vehicle, when the first circuitry determines that the administrator is on board in the boarding determination process; and output, via the third circuitry, the guidance notification of the software update process for the vehicle from the terminal device of the administrator of the vehicle, when the first circuitry determines that the administrator is not on board in the boarding determination process. The first circuitry is configured to perform the process of updating the software of the vehicle, after outputting the guidance notification of the software update process for the vehicle.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
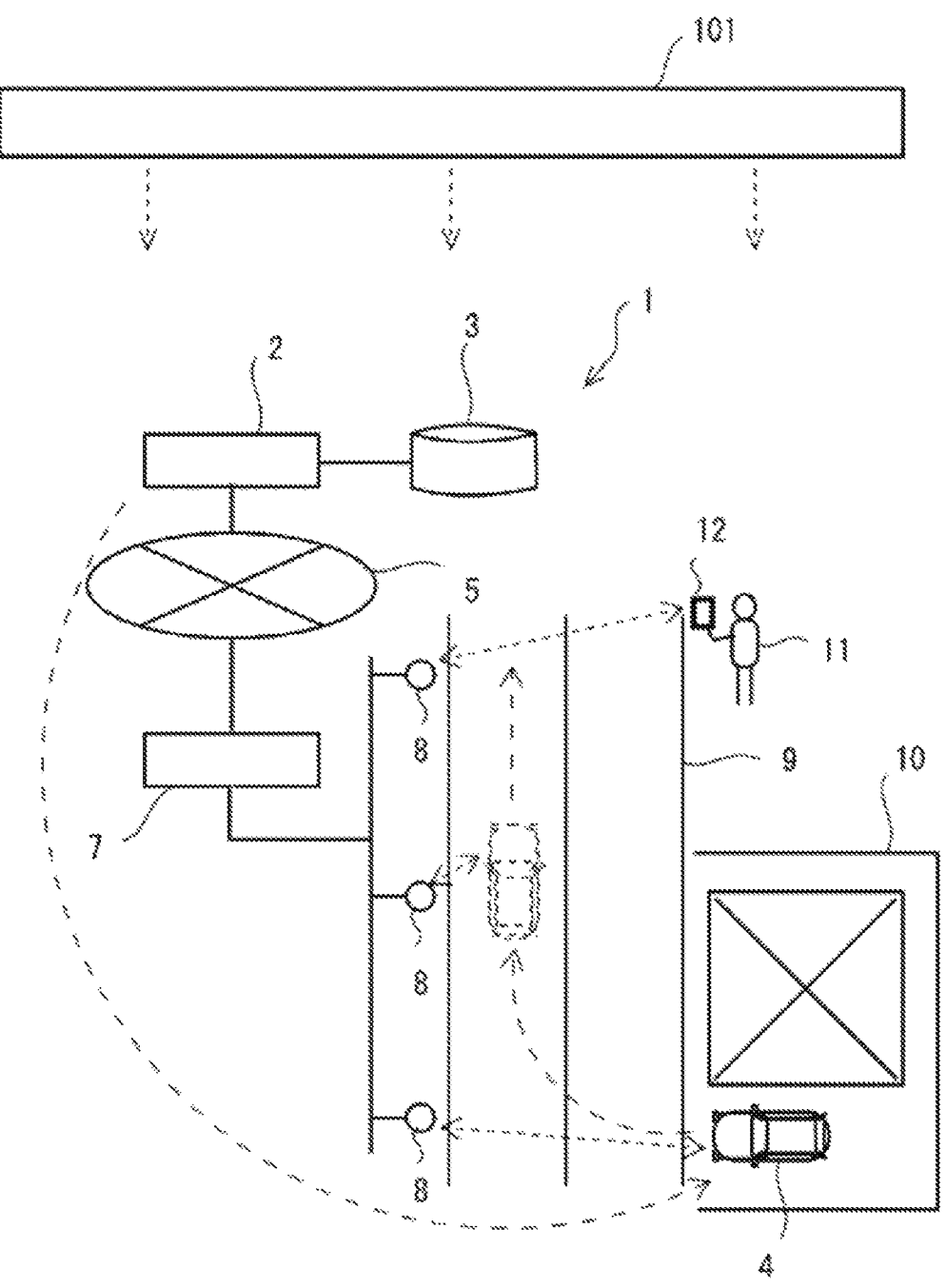
FIG. 1 is an explanatory diagram schematically illustrating an example of a vehicle software update system to which a software update apparatus according to one example embodiment of the disclosure is applicable.

Each of techniques disclosed in JP-A Nos. 2021-128362, 2018-86894, and 2017-97620 determines a traveling state of a vehicle such as traveling or being stopped, and provides a notification of update of software, for example, while the vehicle is parked or stopped.

Thus, the software to be used in the vehicle is updatable even in the vehicle after manufacture. This makes it possible to improve or add an operation to the software to be used in the vehicle.

If the notification is provided as in JP-A Nos. 2021-128362, 2018-86894, and 2017-97620, an occupant on board the vehicle is notified of a software update process while the vehicle is parked or stopped.

On the other hand, a vehicle is generally not used only by a person who has, for example, purchased the vehicle. In one example, a vehicle purchased by a company is used by an employee. In another example, a vehicle purchased by a family head is used by a family member.

In JP-A Nos. 2021-128362, 2018-86894, and 2017-97620 described above, even in a case where such a person other than an administrator of the vehicle is on board, a notification of update of software is provided while the vehicle is parked or stopped.

In this case, if the occupant other than the administrator who has received the notification performs an approval operation regarding the update of the software, the software of the vehicle is updated.

If a person other than the administrator of the vehicle updates the software of the vehicle, it can be difficult for the administrator of the vehicle to manage the vehicle. It can be difficult for the administrator of the vehicle to distinguish between the vehicle with updated software and the vehicle with non-updated software, without performing specific confirmation work. Accordingly, the administrator of the vehicle tends not to notice that the software of the vehicle has been updated.

It is desirable to provide a vehicle software update apparatus that, in updating software of a vehicle, makes it possible for an administrator of the vehicle to appropriately manage the update.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

FIG. 1 is an explanatory diagram schematically illustrating an example of a software update system 1 for a vehicle 4, to which a software update apparatus according to an example embodiment of the disclosure is applicable. In one embodiment, the software update apparatus may serve as a "vehicle software update apparatus".

In FIG. 1, the software update system 1 may include a server 2 and the vehicle 4. To the server 2 may be coupled a database 3. The database 3 may hold, for example, update software to be applied to the vehicle 4.

The server 2 may be coupled to multiple base stations 8, via a communication network 5 and a relay 7. The base stations 8 may be disposed along a road 9. The base station 8 and the relay 7 may be those for 5G communication, or those for advanced driver-assistance systems (ADAS) or intelligent transport systems (ITS). The communication network 5 may include a carrier communication network or the Internet.

The vehicle 4 may be parked at a parking space of a house site 10 of an owner. The vehicle 4 may be, for example, an automobile. Other examples of the vehicle may include a bus, a truck, a motorcycle, and a personal mobility.

The vehicle 4 may carry an occupant such as the owner on board, and travel to a destination of the occupant. As indicated by dashed lines in FIG. 1, the vehicle 4 may go out from the parking space of the house site 10 onto the road 9, and travel on a lane of the road 9.

FIG. 1 also illustrates, near the road 9, a pedestrian 11 carrying a terminal device 12. Examples of the terminal device 12 may include a mobile terminal, a tablet terminal, and a wearable terminal. When the pedestrian 11 is an administrator such as the owner of the vehicle 4, the terminal device 12 may be a key of the vehicle 4. In the following, the terminal device 12 carried by the administrator may be referred to as an administrator terminal (12). The terminal device 12 and the vehicle 4 may each be configured to establish a wireless communication path with the base station 8 provided along the road 9, and perform bidirectional communication with, for example, the server 2.

Figure 2:
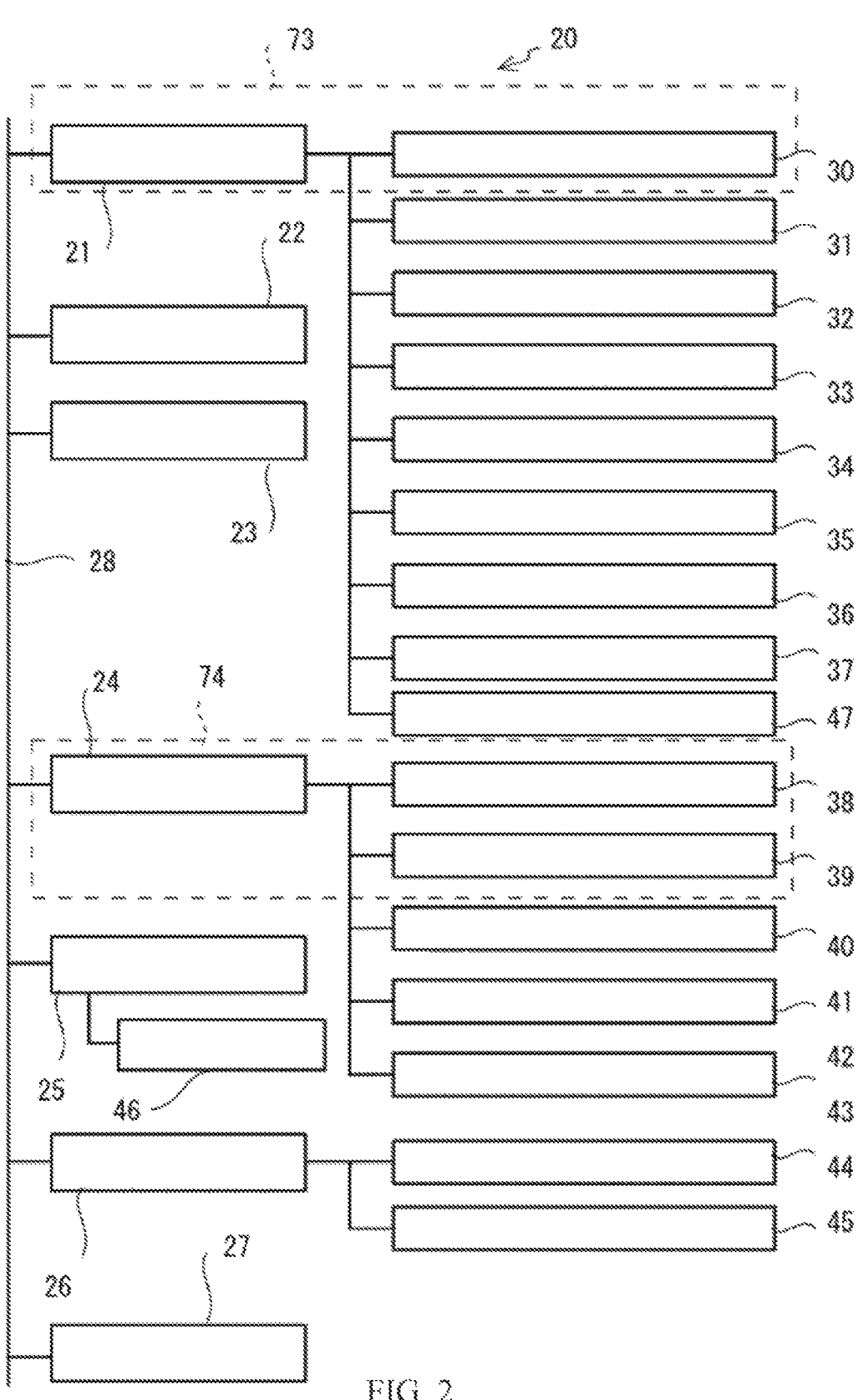
FIG. 2 is an explanatory diagram illustrating an example of a control system of the vehicle in FIG. 1.

FIG. 2 is an explanatory diagram illustrating an example of a control system 20 of the vehicle 4 in FIG. 1.

The control system 20 of the vehicle 4 in FIG. 2 may include a vehicle network 28, and multiple control devices coupled to the vehicle network 28. FIG. 2 illustrates, as examples of the control devices, a detection control device 21, a traveling control device 22, an air conditioning control device 23, an input and output control device 24, a communication control device 25, an operation control device 26, and an update control device 27.

The vehicle network 28 may be a network to be employed in the vehicle 4, such as a controller area network (CAN), a local interconnect network (LIN), a local area network (LAN), a FlexRay, or a clock extension peripheral interface (CXPI). The control devices may transmit and receive messages to and from each other via the vehicle network 28. Thus, the control devices may cooperate with each other to control the vehicle 4.

To the input and output control device 24 may be coupled a user interface device of the vehicle 4. Examples of the user interface device of the vehicle 4 may include a display device 38, a switch, a speaker 40, and a microphone 41 provided on an unillustrated dashboard. The display device 38 may be an output device that displays an image. The display device 38 may have a display surface overlayed with a touch panel. The touch panel and the switch may be examples of an operation device 39 to be operated by the occupant. In one embodiment, the operation device 39 may serve as an "input device". The speaker 40 may be an output device, i.e., a sound output device, that outputs a sound such as a voice to the occupant. The microphone 41 may be a sound input device that detects a voice uttered by the occupant.

The user interface device may additionally include, for example, an unillustrated universal serial bus (USB) connector. To the USB connector may be coupled a USB memory including a hard disk drive (HDD) or a non-volatile semiconductor memory. The USB memory may hold, for example, a program and data to be used in the vehicle 4.

The input and output control device 24 may control operation of the coupled user interface device, to output, for example, an image or a sound to the occupant and detect an input operation or an uttered voice of the occupant. The input and output control device 24 may be configured to control the output device and the input device provided in the vehicle 4.

The input and output control device 24, the display device 38, and the operation device 39 may serve as a head unit 74. The head unit 74 may display information to the occupant and accept an operation in response to the displayed information.

To the detection control device 21 may be coupled various sensors provided in the vehicle 4. FIG. 2 illustrates, as examples of the sensors, a vehicle inside camera 30, a vehicle inside light detection and ranging (LiDAR) 31, a vehicle inside infrared sensor 32, a seating sensor 33, a seat position sensor 34, a temperature sensor 35, a global navigation satellite system (GNSS) receiver 36, an acceleration sensor 37, and a wheel speed sensor 47.

The vehicle inside camera 30 may be a camera that captures an image of the inside of a vehicle compartment of the vehicle 4. The image captured by the vehicle inside camera 30 may include an image component of the occupant on board the vehicle 4. The captured image may include components corresponding to the occupant's head, face, eyes, etc.

The vehicle inside LiDAR 31 may scan, with a laser, the inside of the vehicle compartment of the vehicle 4. Vehicle inside spatial data obtained as a result of scanning by the vehicle inside LiDAR 31 may include a component corresponding to the occupant on board the vehicle 4. The vehicle inside spatial data may include components corresponding to the occupant's head, face, eyes, etc.

The vehicle inside infrared sensor 32 may detect, with infrared rays, the inside of the vehicle compartment of the vehicle 4. Detection data obtained by the vehicle inside infrared sensor 32 may include a component corresponding to the occupant on board the vehicle 4.

The seating sensor 33 may detect whether the occupant is seated on a seat such as an unillustrated driver's seat provided in the vehicle compartment of the vehicle 4. The seat position sensor 34 may detect a seat position of the seat such as the driver's seat. Each of the seating sensor 33 and the seat position sensor 34 can provide different detection values depending on a build of the occupant seated on the driver's seat.

The temperature sensor 35 may detect a temperature such as a body temperature of the occupant present in the vehicle compartment of the vehicle 4.

The GNSS receiver 36 may receive radio waves from GNSS satellites 101 illustrated in FIG. 1, and generate data regarding a current position and a current time of the vehicle 4.

The acceleration sensor 37 may be, for example, a triaxial acceleration sensor. The triaxial acceleration sensor 37 may detect acceleration rates of the vehicle 4 in pitch, roll, and yaw directions.

The wheel speed sensor 47 may detect a speed of an unillustrated wheel of the vehicle 4. When the vehicle 4 is parked or stopped, the wheel speed sensor 47 may provide a detection value of a speed "0".

The detection control device 21 may control operation of each sensor, to acquire detection data such as a detection value from each sensor. The detection control device 21 may also acquire detection data from another control device. For example, the detection control device 21 may acquire a detection value of a shift sensor 44 from the operation control device 26. The detection control device 21 may generate other data from the detection data.

For example, the detection control device 21 may perform an identification process regarding the occupant seated on the seat such as the driver's seat of the vehicle 4, based on, for example, a vehicle inside captured image obtained by the vehicle inside camera 30, the vehicle inside spatial data obtained by the vehicle inside LiDAR 31, and vehicle inside detection data obtained by the vehicle inside infrared sensor 32. In addition, the detection control device 21 may perform a determination process regarding a line-of-sight direction or an opening degree of the eyes of the occupant, based on the image component of the identified occupant's face and eyes, by using, for example, the vehicle inside captured image obtained by the vehicle inside camera 30. These identification and determination may be performed by using data such as an image already registered regarding the occupant. The detection control device 21 that executes such processes may serve as a driver monitoring system (DMS) 73.

Note that sensors including the vehicle inside camera 30, the vehicle inside LiDAR 31, and the vehicle inside infrared sensor 32 may be disposed near the display device 38. In this case, for example, it is possible for the vehicle inside camera 30 to capture an image of the occupant's face directed toward the display device 38 from a substantially front side. When the line of sight of the occupant is directed toward the display device 38, it is possible for the vehicle inside camera 30 to reliably capture an image of the directed line of sight.

To the communication control device 25 may be coupled a communication device 46.

The communication device 46 may establish a wireless communication path with, for example, the base station 8 outside the vehicle, and transmit and receive data to and from, for example, the server 2 or the terminal device 12 including the administrator terminal (12), via the established wireless communication path. The communication device 46 may be a communication device for 5G communication, or a communication device for ADAS or ITS. The communication device 46 may be configured to perform short-range wireless communication.

The communication control device 25 may control operation of the communication device 46, to transmit and receive data to and from, for example, the server 2 or the terminal device 12 including the administrator terminal (12). This communication control device 25 is configured to communicate with the administrator terminal (12) of the administrator of the vehicle 4.

The traveling control device 22 may control traveling of the vehicle 4. The traveling control device 22 may control traveling of the vehicle 4 in accordance with an operation by the occupant seated on the driver's seat, i.e., a driver. The traveling control device 22 may automatically control traveling of the vehicle 4 independently of the driver. In addition, the traveling control device 22 may control traveling of the vehicle 4 by assisting in an operation by the driver.

The air conditioning control device 23 may control a temperature and a humidity of the vehicle compartment that accommodates the occupant in the vehicle 4, based on, for example, a setting made by the occupant.

To the operation control device 26 may be coupled an unillustrated operation member to be used to operate traveling of the vehicle 4. Examples of the operation member may include a steering wheel, a pedal, a shift lever, and a parking brake. In addition, to the operation control device 26 may be coupled the shift sensor 44 and a parking brake sensor 45. The shift sensor 44 may detect a position of the shift lever. The parking brake sensor 45 may detect a position of the parking brake.

The operation control device 26 may detect the occupant's operation on the operation member. For example, the operation control device 26 may use the shift sensor 44 to detect the position to which the shift lever is operated, or use the parking brake sensor 45 to detect the position to which the parking brake is operated.

The update control device 27 is a device provided in the vehicle 4 to update software to be used in the vehicle 4.

As described above, the control system 20 of the vehicle 4 includes, for example, the update control device 27, the input and output control device 24, and the communication control device 25. The control system 20 of the vehicle 4 may serve as the software update apparatus for the vehicle 4.

Figure 3:
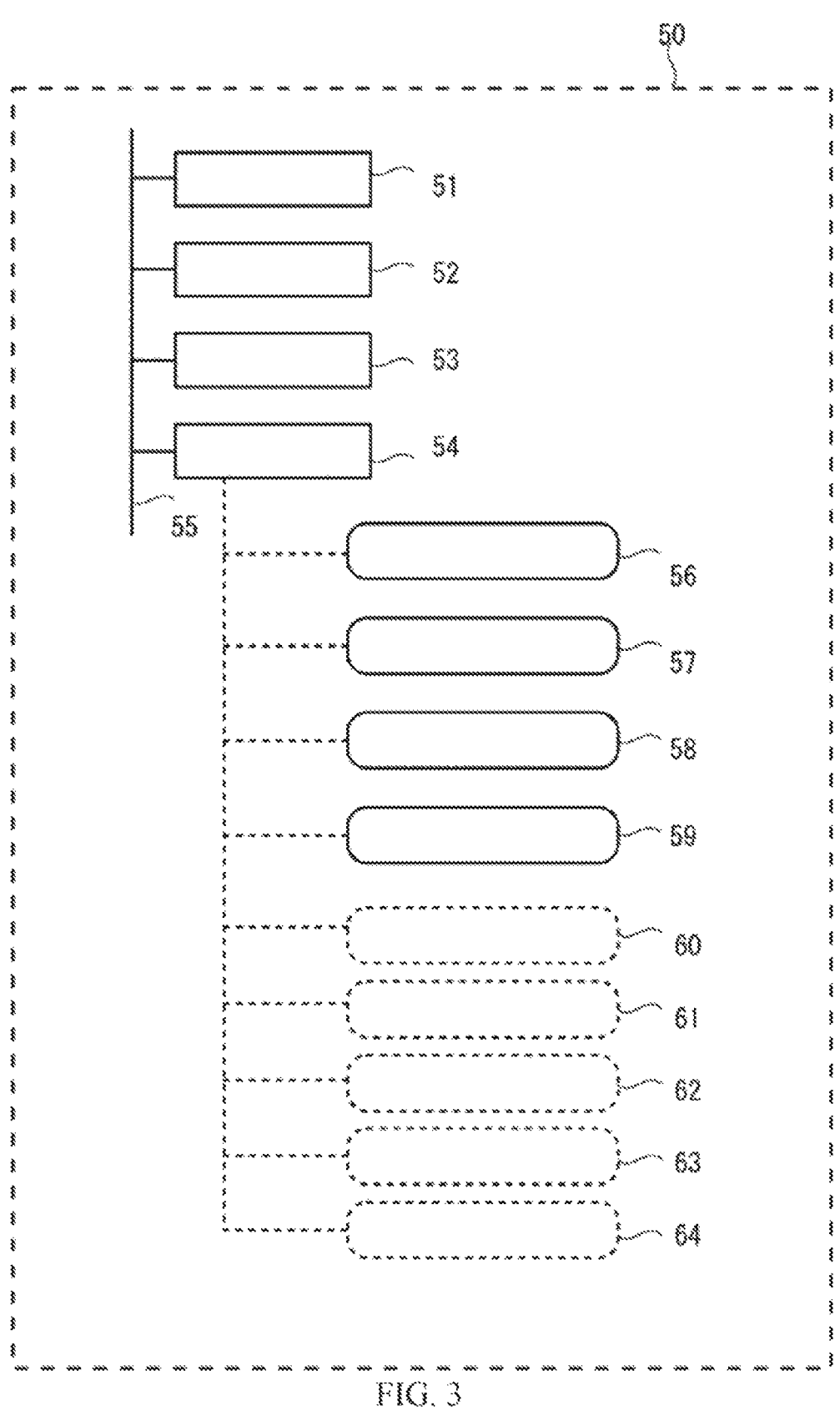
FIG. 3 is an explanatory diagram illustrating a basic configuration of a control device to be used in the control system of the vehicle.

FIG. 3 is an explanatory diagram illustrating a basic configuration of a control device 50 to be used in the control system 20 of the vehicle 4.

Various control devices illustrated in FIG. 2 may basically have the configuration in FIG. 3.

The control device 50 in FIG. 3 may include an internal communicator 51, a timer 52, a central processing unit (CPU) 53, a memory 54, and an internal bus 55. The internal communicator 51, the timer 52, the CPU 53, and the memory 54 may be coupled to the internal bus 55.

The internal communicator 51 may be coupled to the vehicle network 28. The internal communicator 51 may transmit and receive data to and from another control device coupled to the vehicle network 28.

The timer 52 may measure a time period and a time. The time of the timer 52 may be calibrated based on the time generated by the GNSS receiver 36.

The CPU 53 may read and execute a program held in the memory 54. The CPU 53 may thus serve as a processor of the control device 50.

The memory 54 may include, for example, a HDD, a non-volatile semiconductor memory, or a random access memory (RAM). The memory 54 may hold a program 56 to be executed by the CPU 53, and various data to be used by the CPU 53 to execute the program 56. Examples of the various data may include a setting value 57, a parameter 58, and a table 59. The memory 54 may be assigned with a work area to be used by the CPU 53 to execute the program 56.

Here, the software may include not only the program 56, but also the various data, including the setting value 57, the parameter 58, and the table 59, to be used by the CPU 53 to execute the program 56.

In this manner, the various control devices provided in the control system 20 of the vehicle 4 may each implement a control by the CPU 53 executing the program 56 held in the memory 54.

The software such as the program 56 to be used in the vehicle 4 may basically be fixed for the vehicle 4 when the vehicle 4 is manufactured. The software may be made updatable later, which makes it possible to improve or add an operation to the software.

Figure 4:
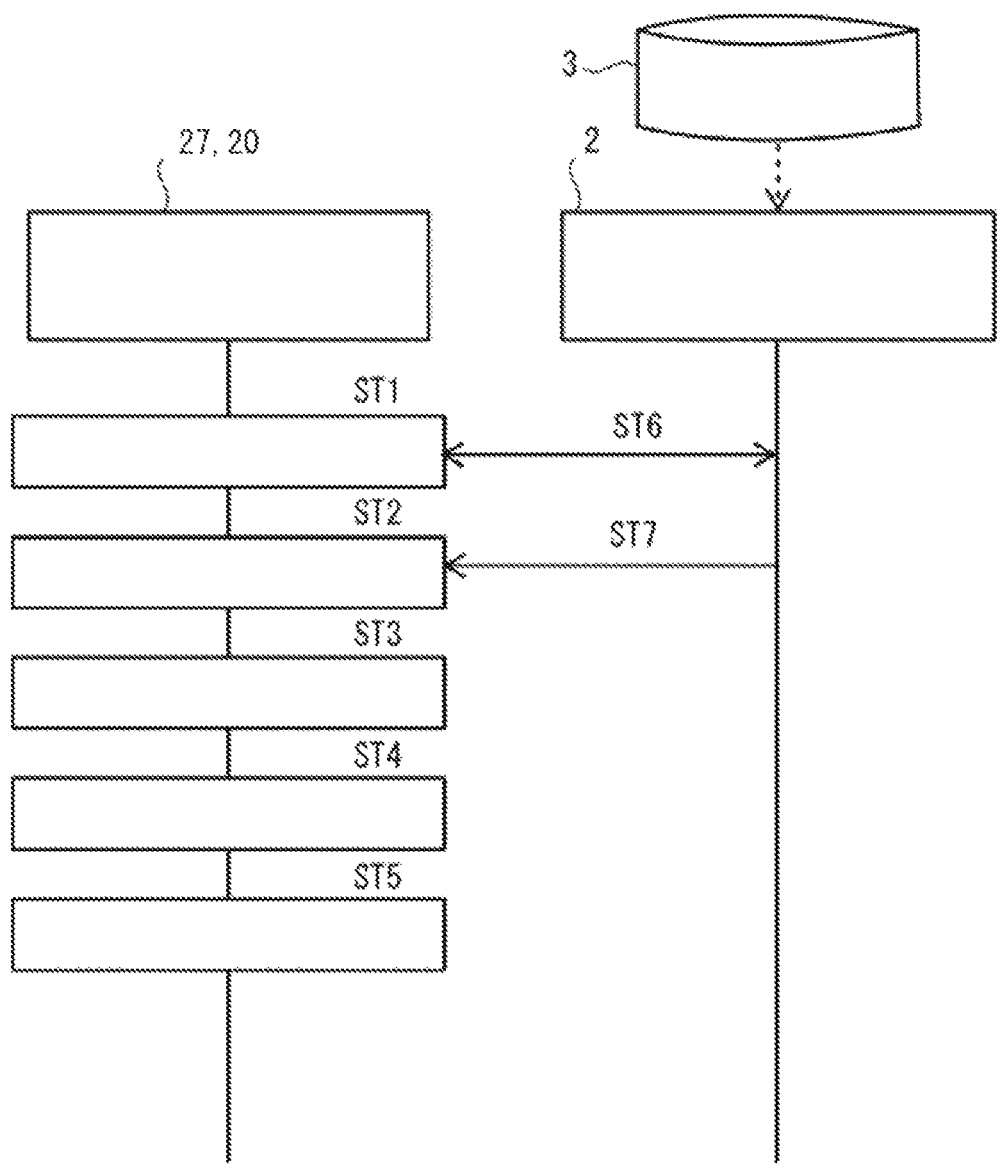
FIG. 4 is a timing chart illustrating an example of a control of updating software of the vehicle, by cooperation between a server in FIG. 1 and the control system of the vehicle.

FIG. 4 is a timing chart illustrating an example of a control of updating the software of the vehicle 4 by cooperation between the server 2 in FIG. 1 and the control system 20 of the vehicle 4.

FIG. 4 illustrates the update control device 27 provided in the control system 20 of the vehicle 4, and also the server 2 and the database 3 coupled to the server 2. The database 3 may hold the update software that may be used in the vehicle

4. The update software may be software regarding the control of one control device provided in the control system 20 of the vehicle 4, or software regarding the controls of multiple control devices provided in the control system 20 of the vehicle 4.

In FIG. 4, time flows from the top to the bottom.

In steps ST1 and ST6, the update control device 27 provided in the control system 20 of the vehicle 4 may start communication with the server 2, by using the communication control device 25 and the communication device 46. For example, the update control device 27 may inquire, of the server 2, whether unapplied new update software for the vehicle 4 in which the update control device 27 is provided is held in the database 3. The server 2 may search the database 3, and return a search result to the update control device 27. The search result may include, for example, presence or absence of unapplied update software, and data regarding unapplied update software.

When there is unapplied update software, in step ST2, the update control device 27 may download and acquire the unapplied update software. For example, the update control device 27 may transmit a download request for the update software to the server 2. The server 2 may acquire the update software related to the request from the database 3, and transmit the update software to the update control device 27 (step ST7). This enables the update control device 27 to acquire the update software unapplied to the own vehicle 4.

In step ST3, the update control device 27 may record the downloaded and acquired update software in the memory 54. This memory 54 may be the memory 54 of the update control device 27, or the memory 54 of another control device to which the update software is to be applied.

In step ST4, the update control device 27 may develop the update software stored in the memory 54, in the memory 54 of the control device 50 to which the update software is to be applied. This makes the update software executable in the control device 50 to which the update software is to be applied.

In step ST5, the update control device 27 may perform activation regarding the software developed in the memory 54 of the control device 50. Thus, the CPU 53 of the control device 50 to which the update software is to be applied may start a control using the software developed in the memory 54 of the control device 50.

The software to be used in the vehicle 4 may be updated in this manner.

Note that, basically, it may be desired not to update the software of the vehicle 4 while the vehicle 4 is traveling. It may be undesired that the program 56 to be executed by the CPU 53 and the setting value 57 and the parameter 58 to be used to execute the program 56 be changed while the vehicle 4 is traveling.

In addition, if the occupant is notified of update of the software of the vehicle 4 while the vehicle 4 is parked or stopped, and the update is performed by the occupant giving an approval, this can result in a situation undesired for the administrator in terms of, for example, management of the vehicle 4. For example, the vehicle 4 is generally not used only by a person who has, for example, purchased the vehicle 4. In one example, the vehicle 4 purchased by a company is used by an employee. In another example, the vehicle 4 purchased by a family head is used by a family member. If an occupant other than the administrator receives the notification and performs an approval operation regarding the update of the software, the software of the vehicle 4 is updated. If a person other than the administrator of the vehicle 4 updates the software of the vehicle 4, it can be difficult for the administrator of the vehicle 4 to manage the vehicle 4. It can be difficult for the administrator of the vehicle 4 to distinguish between the vehicle 4 with updated software and the vehicle 4 with non-updated software, without performing specific confirmation work. Accordingly, the administrator of the vehicle 4 tends not to notice that the software of the vehicle 4 has been updated. In updating the software of the vehicle 4, it may thus be desired to make it possible for the administrator of the vehicle 4 to appropriately manage the update.

As described above, it may be desired to improve the update of the software to be used in the vehicle 4.

Next, description is given of a method of updating the software to be used in the vehicle 4 according to the example embodiment.

Described in the example embodiment is a case where the update control device 27 acquires software from the server 2, and updates the software to be used in the vehicle 4.

Note that a control of updating the software to be used in the vehicle 4 may be performed by another control device provided in the control system 20 of the vehicle 4. In another example, multiple control devices provided in the control system 20 of the vehicle 4 may cooperate with each other to perform the software update control.

The software to be used for the update may be held in a recording medium such as a USB memory.

As illustrated in FIG. 3, the memory 54 of the update control device 27 that performs the control of updating the software to be used in the vehicle 4 may hold data to be used when updating the software. Examples of the held data may include administrator data 60, a sound output setting value 61, terminal transmission data 62, update guidance data 63, and advance guidance data 64.

The administrator data 60 may be data regarding the administrator of the vehicle 4. Examples of the administrator data 60 may include a face image, an age, wearing or non-wearing of glasses, an eyesight value, recorded voice data, and a voice print of the administrator.

The sound output setting value 61 may be the setting value 57 indicating necessity of sound output set by, for example, the administrator of the vehicle 4.

The terminal transmission data 62 may be data to be transmitted to the administrator terminal (12). The terminal transmission data 62 may include the program 56 to be executed by the administrator terminal (12). Note that, when the administrator terminal (12) is installed with the program 56 for management of the vehicle 4, the terminal transmission data 62 may be trigger data to be used to start the program 56.

The update guidance data 63 and the advance guidance data 64 may indicate information to be outputted toward the administrator present in the vehicle 4 to obtain an approval from the administrator, when updating the software to be used in the vehicle 4.

The update guidance data 63 may include data regarding a screen and a sound that provide a notification of contents of a software update process. The screen that provides the notification of the contents of the software update process may include data regarding an operation button to be used by the administrator to select an approval or a disapproval.

The advance guidance data 64 may include data regarding a screen that provides an advance notification of the software update process.

Figure 5:
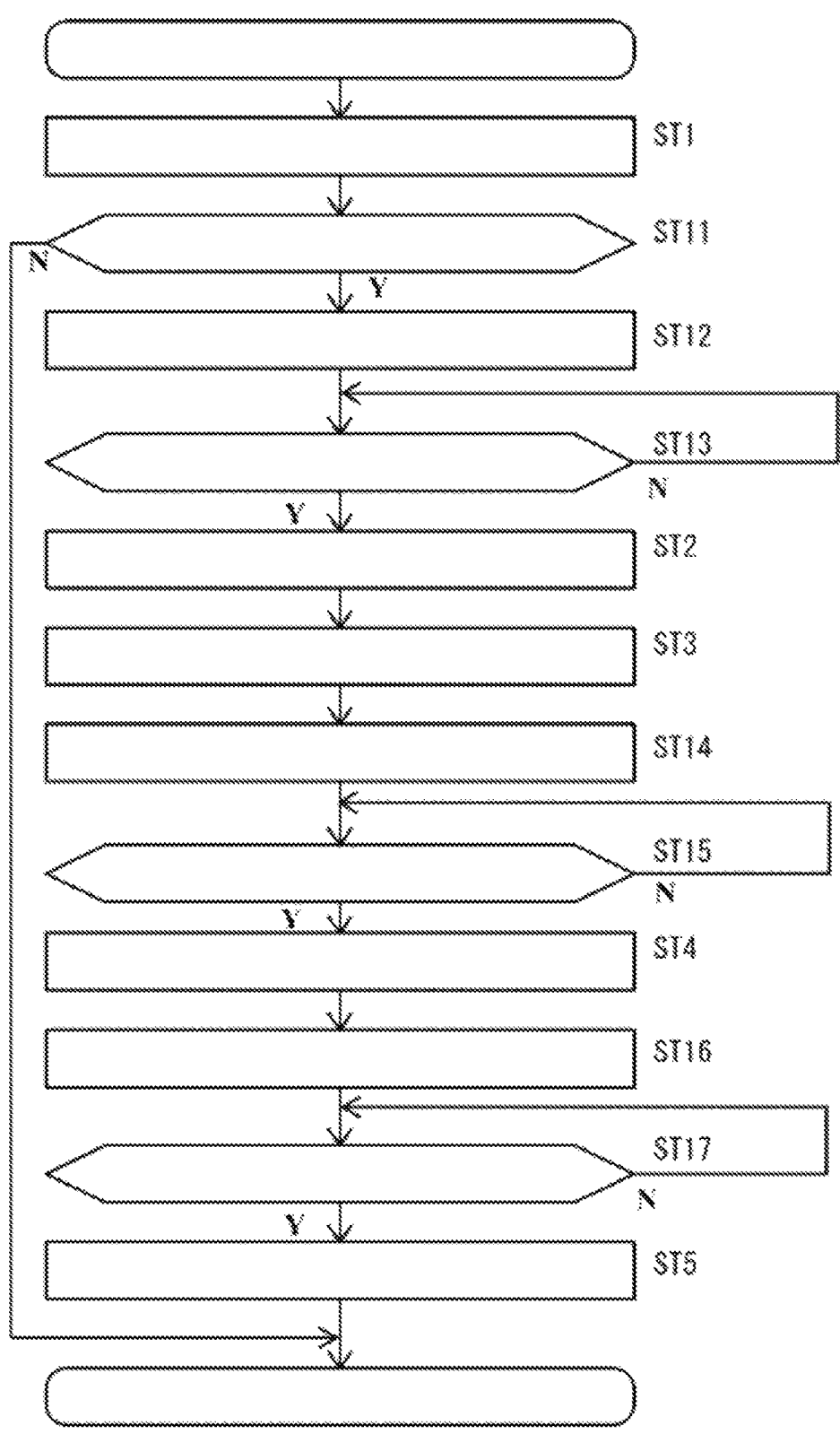
FIG. 5 is a flowchart illustrating a software update control for the vehicle to be performed by an update control device in FIG. 2 in one example embodiment.

FIG. 5 is a flowchart illustrating a software update control for the vehicle 4 to be performed by the update control device 27 in FIG. 2 in the example embodiment.

The CPU 53 of the update control device 27 may repeatedly perform the software update control in FIG. 5. The CPU 53 may repeatedly perform the software update control in FIG. 5, for example, when the occupant is on board the vehicle 4, or when the vehicle 4 is able to travel as a result of an operation on an unillustrated ignition button.

Steps ST1 to ST5 in FIG. 5 may be the same as those in FIG. 4.

After starting the communication with the server 2 in step ST1, the CPU 53 of the update control device 27 may, in step ST11, determine whether there is unapplied update software. If there is no unapplied update software (step ST11: N), the CPU 53 may end the control. If there is unapplied update software (step ST11: Y), the CPU 53 may cause the process to proceed to step ST12.

In step ST12, the CPU 53 may update an update flag to "1", to record that there is unapplied update software. The update flag may take an initial value of "0" as in case where there is no unapplied update software. The update flag may be recorded in the memory 54 of the update control device 27. Note that the update flag may be updated to "0" in step ST34 in FIG. 6 to be described later.

In step ST13, the CPU 53 may determine whether an approval flag has been updated to "1". The approval flag may indicate whether the administrator has approved of the update of the software. When the administrator gives an approval, the approval flag may be updated to "1". When the administrator gives no approval, the approval flag may be updated to "0". The approval flag may take an initial value of "0". The approval flag may be recorded in the memory 54 of the update control device 27.

If the approval flag has not been updated to "1" (step ST13: N), the CPU 53 may repeat the determination process in step ST13. If the approval flag is updated to "1" (step ST13: Y), the CPU 53 may cause the process to proceed to step ST2.

After downloading and acquiring the unapplied update software from the server 2 in step ST2, and recording the update software in the memory 54 in step ST3, the CPU 53 may, in step ST14, update the approval flag to "0" and update the update flag to "1".

In step ST15, the CPU 53 may determine whether the approval flag has been updated to "1". If the approval flag has not been updated to "1" (step ST15: N), the CPU 53 may repeat the determination process in step ST15. If the approval flag is updated to "1" (step ST15: Y), the CPU 53 may cause the process to proceed to step ST4.

After developing the update software recorded in the memory 54 in step ST4, the CPU 53 may, in step ST16, update the approval flag to "0" and update the update flag to "1".

In step ST17, the CPU 53 may determine whether the approval flag has been updated to "1". If the approval flag has not been updated to "1" (step ST17: N), the CPU 53 may repeat the determination process in step ST17. If the approval flag is updated to "1" (step ST17: Y), the CPU 53 may cause the process to proceed to step ST5.

In step ST5, the CPU 53 may perform a process of activating the developed update software. Thus, the update software may be executed by the CPU 53 of the control device 50 to which the update software is to be applied, to be used for a control.

Thereafter, the CPU 53 may end the control.

In this manner, the CPU 53 of the update control device 27 may divide the process of updating the software of the vehicle 4 into multiple stages including a process of acquiring software for the updating by the vehicle 4, a process of developing the software acquired by the vehicle 4 in the vehicle 4, and a process of switching to execution of the software developed in the vehicle 4. Before performing the software update process in each stage, the CPU 53 may obtain an approval regarding the software update process for the vehicle 4.

Figure 6:
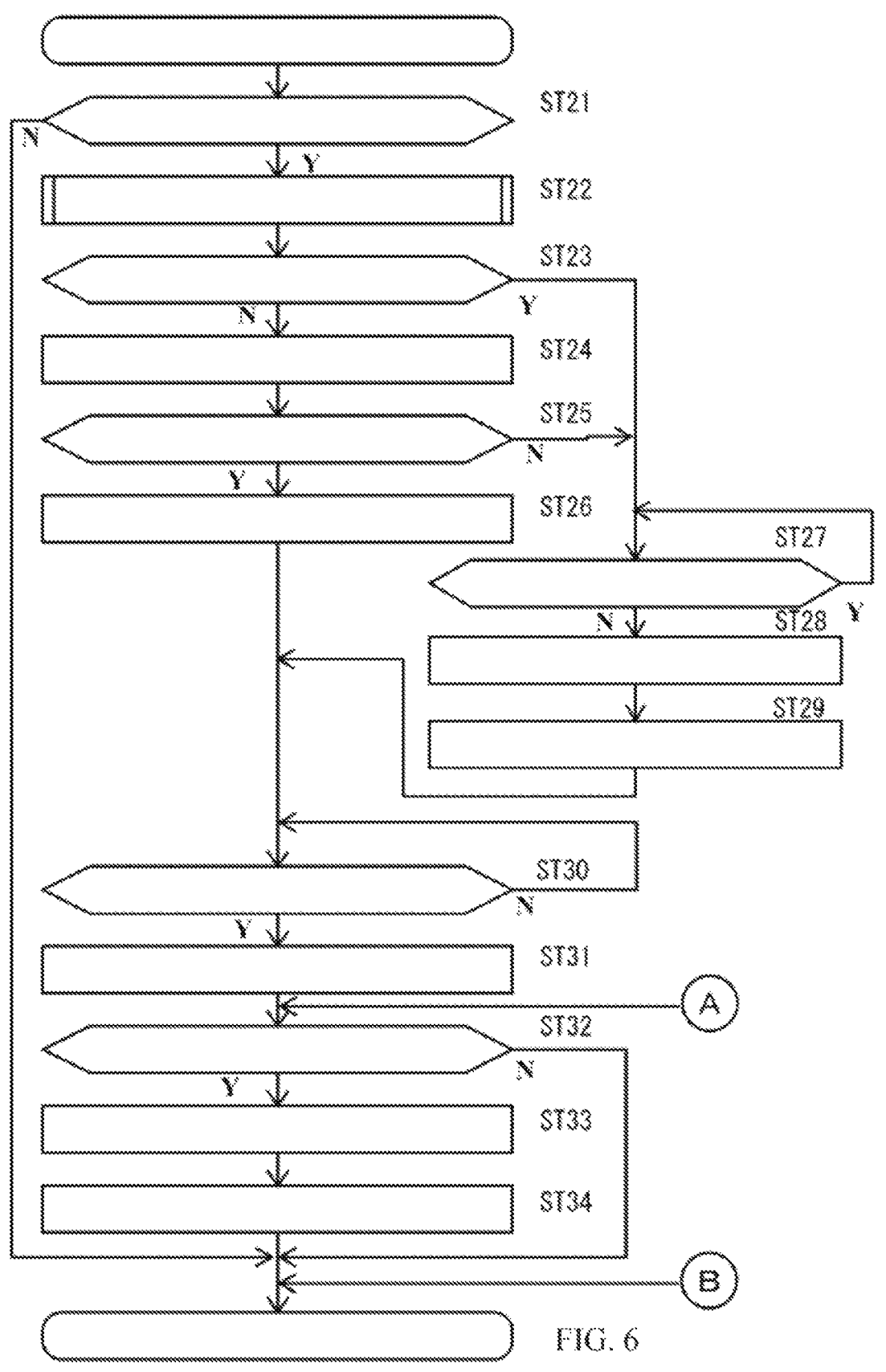
FIG. 6 is a flowchart illustrating an approval control for software update to be performed by the update control device in FIG. 2.

FIG. 6 is a flowchart illustrating an approval control for software update to be performed by the update control device 27 in FIG. 2.

Before performing the software update process in each stage, the CPU 53 of the update control device 27 may repeatedly execute the approval control in FIG. 6, to obtain an approval regarding the software update process for the vehicle 4.

In step ST21, the CPU 53 may determine whether the update flag is "1". When there is the software update process for the vehicle 4 in each stage illustrated in FIG. 5, the update flag may be updated to "1" by the processes in steps ST12, ST14, and ST16. If the update flag is "1" (step ST21: Y), the CPU 53 may cause the process to proceed to step ST22. If the update flag is "0" (step ST21: N), the CPU 53 may end the control.

In step ST22, the CPU 53 may perform a prior confirmation process. The prior confirmation process will be described in detail with reference to FIG. 7.

In step ST23, the CPU 53 may determine the necessity of sound output, based on the sound output setting value 61 regarding the administrator held in the memory 54. Thus, it is possible for the CPU 53 to perform a setting determination process before a visual ability determination process. The setting determination process may be a process of acquiring sound output setting data regarding the occupant and acquirable in the vehicle 4, and determining whether an audio guidance notification is to be outputted. If the setting value 57 indicates that sound is to be outputted (step ST23: Y), the CPU 53 may cause the process to proceed to step ST27. If the setting value 57 indicates that no sound is to be outputted (step ST23: N), the CPU 53 may cause the process to proceed to step ST24.

In step ST24, the CPU 53 may perform the visual ability determination process of determining a visual ability of the administrator on board the vehicle 4 to view guidance display of the software update process for the vehicle 4.

For example, the CPU 53 may determine the visual ability of the administrator, based on the administrator data 60 held in the memory 54. In this case, the CPU 53 may determine the visual ability of the administrator, based on whether the occupant's age is a predetermined age, for example, 60, or older.

In another example, the CPU 53 may determine the visual ability of the administrator, based on the image captured by the vehicle inside camera 30. In this case, the CPU 53 may determine the visual ability of the administrator, based on whether the administrator exhibits a behavior of narrowing one's eyes when viewing the display device 38.

In step ST25, the CPU 53 may determine whether the administrator has the visual ability, based on the visual ability of the administrator determined in step ST24.

For example, if the occupant's age is the predetermined age or older, or the occupant exhibits the behavior of narrowing one's eyes (step ST25: N), the CPU 53 may determine that the visual ability is insufficient, and cause the process to proceed to step ST27. The CPU 53 may cause the process to proceed to step ST27 regardless of the sound output setting value 61.

If neither of these cases applies (step ST25: Y), the CPU 53 may determine that the visual ability is sufficient, and cause the process to proceed to step ST26.

In step ST26, the CPU 53 may display, via the input and output control device 24, a guidance notification of the software update process for the vehicle 4 on the display device 38. The display device 38 may display the guidance notification of the software update process for the vehicle 4. The guidance display on the display device 38 here may be normal display in a font size easily visible based on a determination criterion in the visual ability determination process described above.

In the guidance display, images of multiple operation buttons to be used by the occupant such as the administrator to select an approval or a disapproval may be displayed in a state of being able to receive an input operation.

In this manner, when the CPU 53 determines that no audio guidance notification is to be outputted in the setting determination process, the CPU 53 may output the guidance notification of the software update process for the vehicle 4 by the normal display, based on the determination in the visual ability determination process.

Thereafter, the CPU 53 may cause the process to proceed to step ST30.

In step ST27, the CPU 53 may determine whether the display device 38 is in use for, for example, navigation setting. If the display device 38 is in use (step ST27: Y), the CPU 53 may repeatedly execute the process. If the display device 38 is or becomes out of use (step ST27: N), the CPU 53 may cause the process to proceed to step ST28.

In step ST28, the CPU 53 may display, via the input and output control device 24, the guidance notification of the software update process for the vehicle 4 on the display device 38. In displaying, via the input and output control device 24, the guidance notification of the software update process for the vehicle 4 on the display device 38, the CPU 53 may, when the occupant of the vehicle 4 is using the display device 38, display the guidance notification of the software update process for the vehicle 4 on the display device 38 after the end of the use of the display device 38.

The display device 38 may display the guidance notification of the software update process for the vehicle 4. The guidance display on the display device 38 here may be increased in font size and reduced in word count as compared with the normal display in step ST26 described above.

In the guidance display, images of multiple operation buttons to be used by the occupant such as the administrator to select an approval or a disapproval may be displayed in a state of being able to receive an input operation.

In this manner, when the CPU 53 does not determine that the occupant has the ability to view the guidance display in the visual ability determination process, the CPU 53 may display a second guidance notification with higher visibility than a first guidance notification displayed in step ST26 on the display device 38.

In step ST29, the CPU 53 may cause, via the input and output control device 24, the speaker 40 to output an audio guidance notification.

In this manner, when the CPU 53 determines that an audio guidance notification is to be outputted in the setting determination process, the CPU 53 may output an audio guidance notification of the software update process for the vehicle 4.

In addition, when the CPU 53 determines that an audio guidance notification is to be outputted based on the determination in the visual ability determination process, the CPU 53 may output an audio guidance notification of the software update process for the vehicle 4.

Thereafter, the CPU 53 may cause the process to proceed to step ST30.

In step ST30, the CPU 53 may determine whether the guidance to the administrator is to be ended. If the CPU 53 does not determine that the guidance to the administrator is to be ended (step ST30: N), the CPU 53 may repeat the process. The CPU 53 may basically determine that the guidance to the administrator is to be ended, upon displaying the guidance notification on the display device 38 and ending the outputting of the audio guidance notification. In this case (step ST30: Y), the CPU 53 may cause the process to proceed to step ST31.

In step ST31, the CPU 53 may permit approval input regarding the software update process for the vehicle 4 by the administrator. The CPU 53 may put the operation buttons included in the guidance display on the display device 38 into a state of being able to receive an input operation. This enables the administrator to operate the touch panel to input an approval or a disapproval regarding the software update process for the vehicle 4.

In step ST32, the CPU 53 may determine whether the administrator has, by the input operation in step ST31, inputted an approval regarding the software update process for the vehicle 4. If the administrator has inputted an approval (step ST32: Y), the CPU 53 may cause the process to proceed to step ST33. If the administrator has inputted a disapproval (step ST32: N), the CPU 53 may end the control. In this case, the CPU 53 may end the control with the update flag kept at "1" and the approval flag kept at "0". The software update process for the vehicle 4 may not be executed.

In step ST33, the CPU 53 may update the approval flag to "1". Thus, the software update process for the vehicle 4 for which an approval has been requested may be executed.

In step ST34, the CPU 53 may update the update flag to "0". Thereafter, the CPU 53 may end the control.

In this manner, by the controls in FIGS. 5 and 6, the CPU 53 may output the guidance notification of the software update process for the vehicle 4 to acquire an approval inputted by the administrator, and perform the process of updating the software of the vehicle 4 when an approval is inputted by the administrator.

When no approval is inputted by the administrator, the CPU 53 may, in the present approval control, interrupt the process of updating the software of the vehicle 4.

In addition, the CPU 53 may determine the visual ability of the administrator before acquiring an approval inputted by the administrator. When the visual ability is sufficient, the CPU 53 may refrain from providing an audio guidance notification. The CPU 53 may provide an audio guidance notification when the visual ability is insufficient. It is possible for the CPU 53 to prevent an audio guidance notification from being excessively provided to, for example, a young administrator having a sufficient visual ability.

Figure 7:
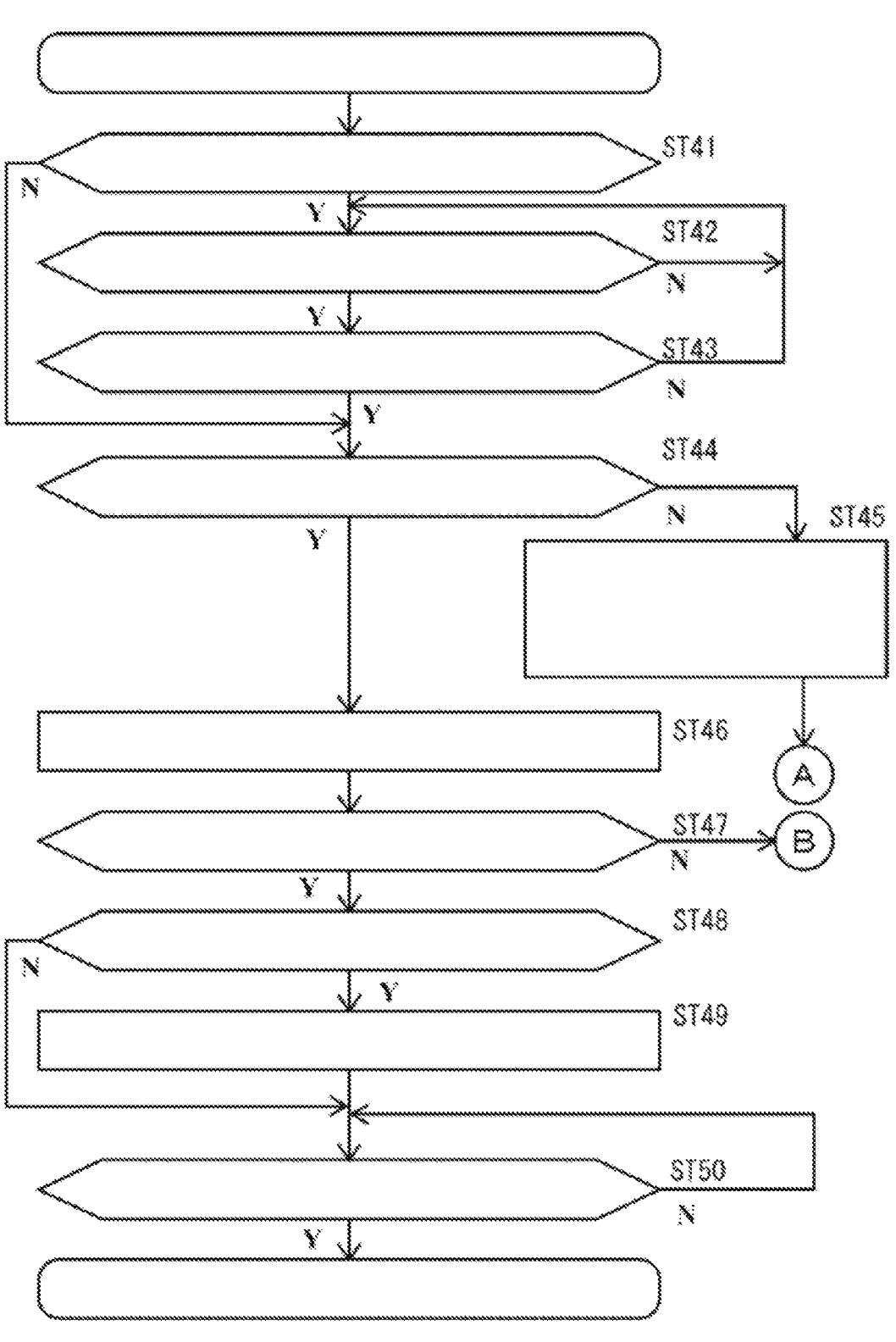
FIG. 7 is a flowchart illustrating a prior confirmation control to be performed by the update control device in FIG. 2 in a prior confirmation process in step ST22 in FIG. 6.

FIG. 7 is a flowchart illustrating a prior confirmation control to be performed by the update control device 27 in FIG. 2 in the prior confirmation process in step ST22 in FIG. 6.

The CPU 53 may execute the prior confirmation control in FIG. 7, before acquiring an approval inputted by the administrator for the update of the software of the vehicle 4.

In step ST41, the CPU 53 may determine whether the present software update process is the activation in step ST5 in FIG. 5. If the present software update process is the activation (step ST41: Y), the CPU 53 may cause the process to proceed to step ST42. If the present software update process is other than the activation (step ST41: N), the CPU 53 may cause the process to proceed to step ST44. Examples of the software update process other than the activation may include the process of downloading the software in step ST2 in FIG. 5 and the process of developing the software in step ST4 in FIG. 5.

In step ST42, the CPU 53 may determine whether the current position of the vehicle 4 is a location registered in the memory 54 in advance. Used as the current position of the vehicle 4 may be, for example, the position generated by the GNSS receiver 36. For example, the administrator may register a position such as the house site 10 as in FIG. 1 in the memory 54 in advance. If the current position of the vehicle 4 is not the registered location (step ST42: N), the CPU 53 may repeat the process. If the current position of the vehicle 4 becomes the registered location (step ST42: Y), the CPU 53 may cause the process to proceed to step ST43.

In step ST43, the CPU 53 may determine whether the current time of the vehicle 4 is a time slot registered in the memory 54 in advance. For example, the administrator may register a time slot when the vehicle 4 is used less frequently, such as a nighttime time slot, in the memory 54 in advance. If the current time of the vehicle 4 is not the registered time slot (step ST43: N), the CPU 53 may cause the process to return to step ST42. If the current time of the vehicle 4 becomes the registered time slot (step ST43: Y), the CPU 53 may cause the process to proceed to step ST44. In this case, the vehicle 4 is present at the registered location in the registered time slot.

In step ST44, the CPU 53 may determine whether the administrator of the vehicle 4 is on board the vehicle 4, as a boarding determination process. For example, the CPU 53 may perform a process of extracting the occupant from the image captured by the vehicle inside camera 30, compare features of the extracted occupant with the administrator data 60 recorded in the memory 54 in advance, and determine a coincidence between them. If the occupant whose coincidence with the administrator data 60 is greater than or equal to a threshold is included in the captured image (step ST44: Y), the CPU 53 may determine that the administrator is on board the vehicle 4. In this case, the CPU 53 may cause the process to proceed to step ST46. If only the occupant whose coincidence with the administrator data 60 is not greater than or equal to the threshold is included in the captured image (step ST44: N), the CPU 53 may determine that the administrator is not on board the vehicle 4. In this case, the CPU 53 may cause the process to proceed to step ST45. In addition, if the occupant is not extractable from the image captured by the vehicle inside camera 30, the CPU 53 may determine that the administrator is not on board the vehicle 4. In this case, the CPU 53 may cause the process to proceed to step ST45.

In step ST45, the CPU 53 may perform a process of obtaining an approval from the administrator by using the administrator terminal (12). For example, the CPU 53 may transmit a guidance screen regarding the software update process to the administrator terminal (12) to cause the administrator terminal (12) to display the guidance screen, and acquire data regarding the administrator's approval input to the administrator terminal (12) in response to the guidance screen. Note that, when the administrator terminal (12) is installed with an application program for management of the vehicle 4 in advance, the CPU 53 may transmit an instruction for execution of the application program to the administrator terminal (12). Thereafter, the CPU 53 may cause the process to proceed to step ST32 in FIG. 6. The CPU 53 may determine whether the data regarding the approval input acquired from the administrator terminal (12) indicates an approval. If the data indicates an approval, the CPU 53 may update the approval flag to "1". In addition, the CPU 53 may perform the software update process.

In step ST46, the CPU 53 may determine, as a physical condition determination process, a physical condition of the administrator determined as being onboard the vehicle 4 in the boarding determination process.

For example, the CPU 53 may determine the physical condition of the administrator, based on the image component of the administrator extracted from the image captured by the vehicle inside camera 30. When the physical condition of the administrator is favorable, the administrator is able to be, for example, seated with an upright posture on the driver's seat. In contrast, when the physical condition of the administrator is not favorable, the administrator is, for example, seated on the driver's seat with a leaning posture in some cases. The CPU 53 may determine the physical condition of the administrator, based on a seating posture of the administrator on the driver's seat.

The CPU 53 may determine the physical condition of the administrator, based on detection data regarding the administrator obtained by the vehicle inside infrared sensor 32. When the occupant such as the administrator is detected based on infrared rays, the detection data may include data regarding the physical condition such as a pulse of the occupant. The CPU 53 may determine the physical condition of the occupant, based on whether the pulse is within a range of normal values.

In step ST47, the CPU 53 may determine whether the physical condition of the administrator is favorable. If the physical condition of the administrator is favorable (step ST47: Y), the CPU 53 may cause the process to proceed to step ST48. If the physical condition of the administrator is not favorable (step ST47: N), the CPU 53 may cause the process to return to FIG. 6. The CPU 53 may end the approval control in FIG. 6, without updating the approval flag to "1". In this case, the CPU 53 may refrain from providing a notification for guidance on the software update process to the administrator, when the physical condition of the administrator does not seem to be favorable.

In step ST48, the CPU 53 may determine whether the vehicle 4 is traveling.

The CPU 53 may determine whether the vehicle 4 is traveling, based on the detection value of the wheel speed sensor 47 that detects the speed of the wheel, or the detection value of the shift sensor 44 that detects a shift state of the shift lever.

In another example, the CPU 53 may determine whether the vehicle 4 is traveling, based on whether the detection value of the acceleration sensor 37 is "0".

If the vehicle 4 is traveling (step ST48: Y), the CPU 53 may cause the process to proceed to step ST49. If the vehicle 4 is not traveling (step ST48: N), the CPU 53 may cause the process to proceed to step ST50.

In step ST49, the CPU 53 may display, via the input and output control device 24, an advance guidance notification of the software update process for the vehicle 4 on the display device 38. Thus, when the vehicle 4 is traveling, the CPU 53 may display an advance notification of the software update process for the vehicle 4, instead of the guidance notification of the software update process for the vehicle 4.

In step ST50, the CPU 53 may determine whether the vehicle 4 is stopped.

The CPU 53 may determine whether the vehicle 4 is stopped, based on the detection value of the wheel speed sensor 47 that detects the speed of the wheel, or the detection value of the shift sensor 44 that detects the shift state of the shift lever.

In another example, the CPU 53 may determine whether the vehicle 4 is stopped, based on whether the detection value of the acceleration sensor 37 is "0".

If the vehicle 4 is not stopped (step ST50: N), the CPU 53 may repeat the process.

If the vehicle 4 becomes stopped (step ST50: Y), the CPU 53 may end the prior confirmation control in FIG. 7, and cause the process to proceed to step ST23 in FIG. 6.

In this manner, by the controls in FIGS. 6 and 7, the CPU 53 may perform the setting determination process and the visual ability determination process, and output the guidance notification of the software update process for the vehicle 4, when the vehicle 4 stops traveling after the providing of the advance guidance notification.

In addition, when the CPU 53 determines that the administrator is on board in the boarding determination process, the CPU 53 may output, via the input and output control device 24, the guidance notification of the software update process for the vehicle 4 from the output device provided in the vehicle 4, at a timing when the vehicle 4 is stopped and not traveling. In contrast, when the CPU 53 determines that the administrator is not on board the vehicle 4, the CPU 53 may output, via the communication control device 25, the guidance notification of the software update process for the vehicle 4 from the administrator terminal (12). After outputting the guidance notification of the software update process, the CPU 53 may perform the process of updating the software of the vehicle 4.

In addition, when the CPU 53 determines that the physical condition of the administrator of the vehicle 4 is favorable in the physical condition determination process, the CPU 53 may output, via the input and output control device 24, the guidance notification of the software update process for the vehicle 4 from the output device provided in the vehicle 4. In contrast, when the CPU 53 determines that the physical condition of the administrator of the vehicle 4 is not favorable, the CPU 53 may stop outputting the guidance notification of the software update process for the vehicle 4, and interrupt the present software update process for the vehicle 4.

Figure 8:
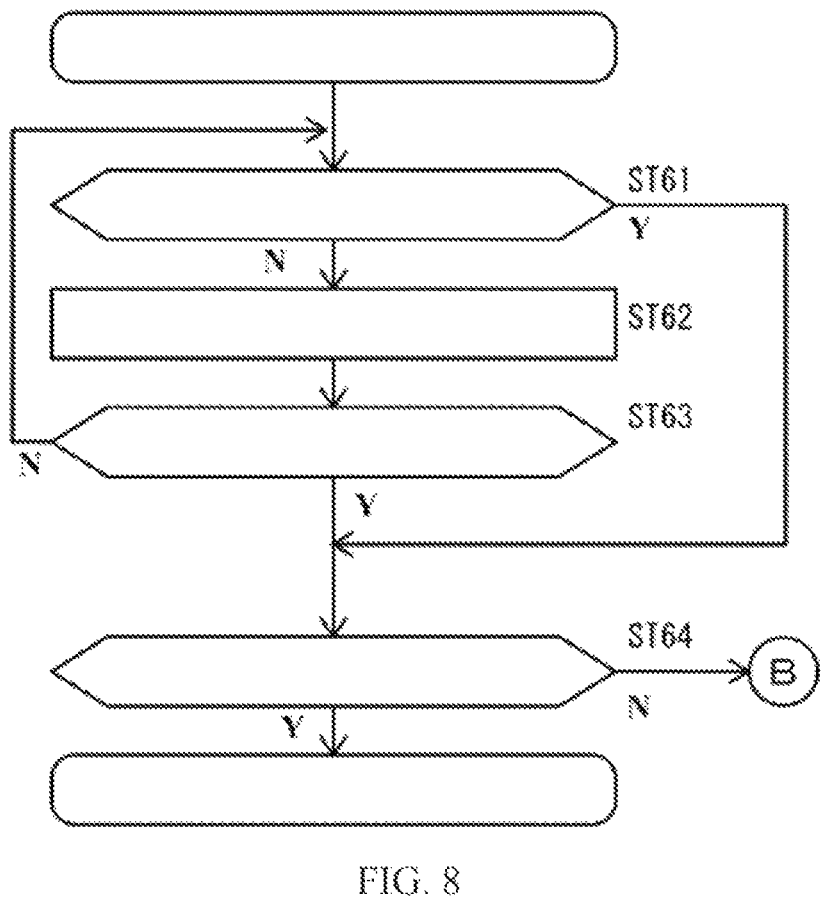
FIG. 8 is a flowchart illustrating a guidance end determination control to be performed by the update control device in FIG. 2 in a guidance end determination process in step ST30 in FIG. 6.

FIG. 8 is a flowchart illustrating a guidance end determination control to be performed by the update control device 27 in FIG. 2 in a guidance end determination process in step ST30 in FIG. 6.

The CPU 53 may perform the guidance end determination control in FIG. 8 before permitting approval input by the administrator, after starting to output, via the input and output control device 24, the guidance notification of the software update process for the vehicle 4 toward the administrator in the vehicle 4.

In step ST61, the CPU 53 may determine whether the audio notification has ended. When the administrator has the visual ability, the CPU 53 may refrain from outputting an audio notification. When the administrator does not have the visual ability, the CPU 53 may output an audio notification. The outputting of the audio notification may end in a predetermined time period. If the CPU 53 has outputted no audio notification or has ended the audio notification as described above (step ST61: Y), the CPU 53 may determine that the audio notification has ended, and cause the process to proceed to step ST64. If the CPU 53 is outputting the audio notification (step ST61: N), the CPU 53 may determine that the audio notification has not ended, and cause the process to proceed to step ST62.

In step ST62, the CPU 53 may determine, as a visual recognition determination process, a viewing state of the displayed guidance notification by the administrator on board the vehicle 4.

For example, the CPU 53 may determine the line-of-sight direction of the administrator, based on the image captured by the vehicle inside camera 30. When the line-of-sight direction of the administrator is directed to the display device 38, the CPU 53 may determine that the administrator has visually recognized the displayed guidance notification.

In step ST63, the CPU 53 may determine whether the administrator on board the vehicle 4 has visually recognized the displayed guidance notification.

For example, if a viewing period during which the administrator is continuously viewing the displayed guidance notification is greater than or equal to a threshold (step ST63: Y), the CPU 53 may determine that the administrator has recognized the guidance notification. In this case, the CPU 53 may cause the process to proceed to step ST64. The CPU 53 may cause the process to proceed to step ST64 even before ending the outputting of the audio guidance notification, when the CPU 53 determines that the administrator has visually recognized the notification in the visual recognition determination process repeated during the outputting of the guidance notification.

If the viewing period is not greater than or equal to the threshold (step ST63: N), the CPU 53 may not determine that the administrator has recognized the guidance notification. In this case, the CPU 53 may cause the process to return to step ST61. The CPU 53 may repeatedly execute the processes in steps ST61 to ST63, until the CPU 53 determines that the administrator has recognized the guidance notification.

In step ST64, the CPU 53 may determine again whether the administrator is on board the vehicle 4, as a boarding re-determination process.

If the administrator is on board the vehicle 4 (step ST64: Y), the CPU 53 may end the guidance end determination control in FIG. 8, and cause the process to proceed to step ST31 in FIG. 6. In other words, the CPU 53 may permit approval input by the administrator in step ST31, if the CPU 53 determines that the administrator is on board even at present when the CPU 53 is providing the guidance notification.

If the administrator is not on board the vehicle 4 (step ST64: N), the CPU 53 may end the guidance end determination control in FIG. 8, and end the control in FIG. 6. In this case, the CPU 53 may stop outputting the guidance notification of the software update process for the vehicle 4, and interrupt the present process of updating the software of the vehicle 4.

In this manner, the CPU 53 may determine whether the administrator is on board the vehicle 4 before and after the guidance notification. Thus, even upon time elapse from a timing when whether the administrator is on board is determined before the guidance notification, it is possible to provide the notification for update guidance to the administrator.

Next, description is given of various screens to be displayed on the display device 38 in the software update control described above.

Figure 9:
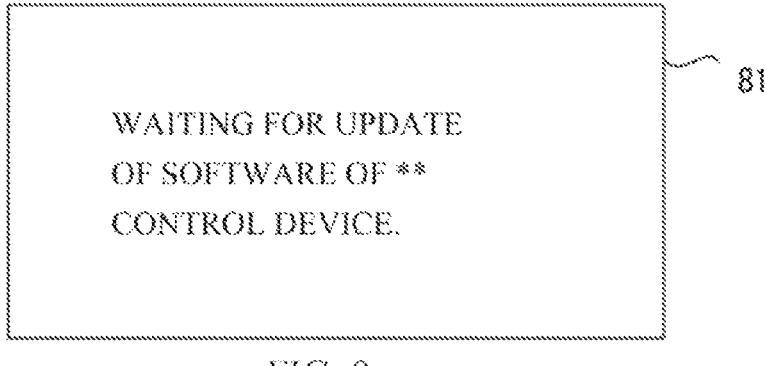
FIG. 9 is a diagram illustrating an example of an advance guidance screen to be displayed on a display device in step ST49 in FIG. 7.

FIG. 9 is a diagram illustrating an example of an advance guidance screen 81 to be displayed on the display device 38 in step ST49 in FIG. 7.

The advance guidance screen 81 may include a message indicating a state of waiting for software update.

Figure 10:
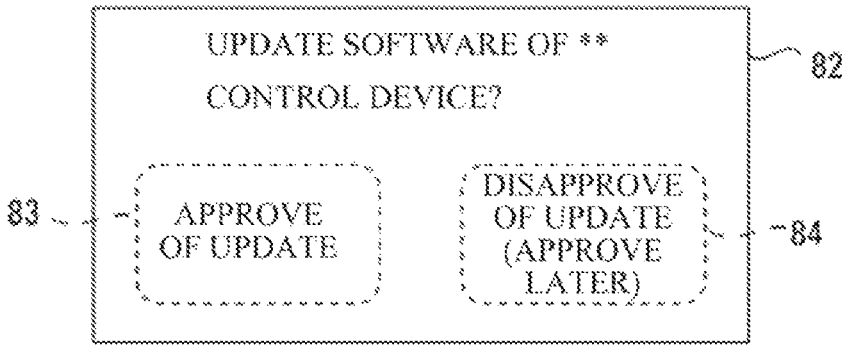
FIG. 10 is a diagram illustrating an example of a normal update guidance screen to be displayed on the display device in step ST26 in FIG. 6.

FIG. 10 is a diagram illustrating an example of a normal update guidance screen 82 to be displayed on the display device 38 in step ST26 in FIG. 6.

The normal update guidance screen 82 may include a message indicating that the software update process is to be executed, and an approval button 83 and a disapproval button 84 for the update process. At this time, the approval button 83 and the disapproval button 84 may be displayed in a non-selectable state of not being operable by the occupant, as indicated by dashed lines.

Figure 11:
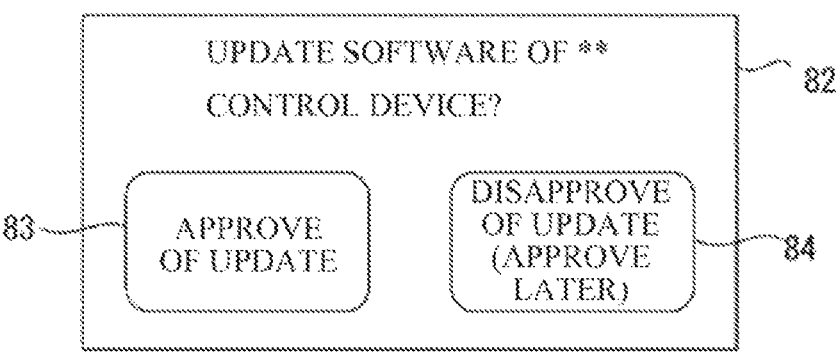
FIG. 11 is a diagram illustrating an example of the normal update guidance screen in a state in which approval input has been permitted in step ST31 in FIG. 6.

FIG. 11 is a diagram illustrating an example of the normal update guidance screen 82 in a state in which approval input has been permitted in step ST31 in FIG. 6.

In FIG. 11, the approval button 83 and the disapproval button 84 may be displayed in a selectable state of being operable by the occupant, as indicated by solid lines.

Figure 12:
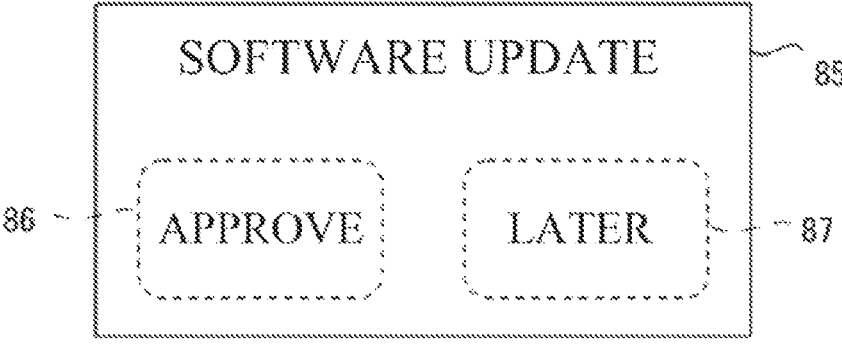
FIG. 12 is a diagram illustrating an example of an update guidance screen with improved visibility to be displayed on the display device in step ST28 in FIG. 6.

FIG. 12 is a diagram illustrating an example of an update guidance screen 85 with improved visibility to be displayed on the display device 38 in step ST28 in FIG. 6.

The update guidance screen 85 with improved visibility may include a message indicating that the software update process is to be executed, and an approval button 86 and a disapproval button 87 for the update process. At this time, the approval button 86 and the disapproval button 87 may be displayed in a non-selectable state of not being operable by the occupant, as indicated by dashed lines. The font of the message and the font of the buttons may be increased as compared with those of the normal update guidance screen 82 in FIG. 10. In addition, the word count of the message and the word count of the buttons may be reduced as compared with those of the normal update guidance screen 82 in FIG. 10. This enables even an old administrator to easily understand, at a glance at the display device 38, that the software update process is about to be executed.

Figure 13:
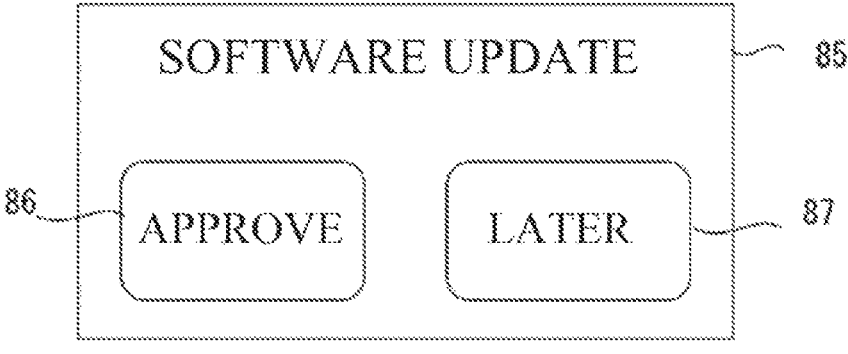
FIG. 13 is a diagram illustrating an example of the update guidance screen with improved visibility in the state in which approval input has been permitted in step ST31 in FIG. 6.

FIG. 13 is a diagram illustrating an example of the update guidance screen 85 with improved visibility in a state in which approval input has been permitted in step ST31 in FIG. 6.

In FIG. 13, the approval button 86 and the disapproval button 87 may be displayed in a selectable state of being operable by the occupant, as indicated by solid lines.

Figure 14:
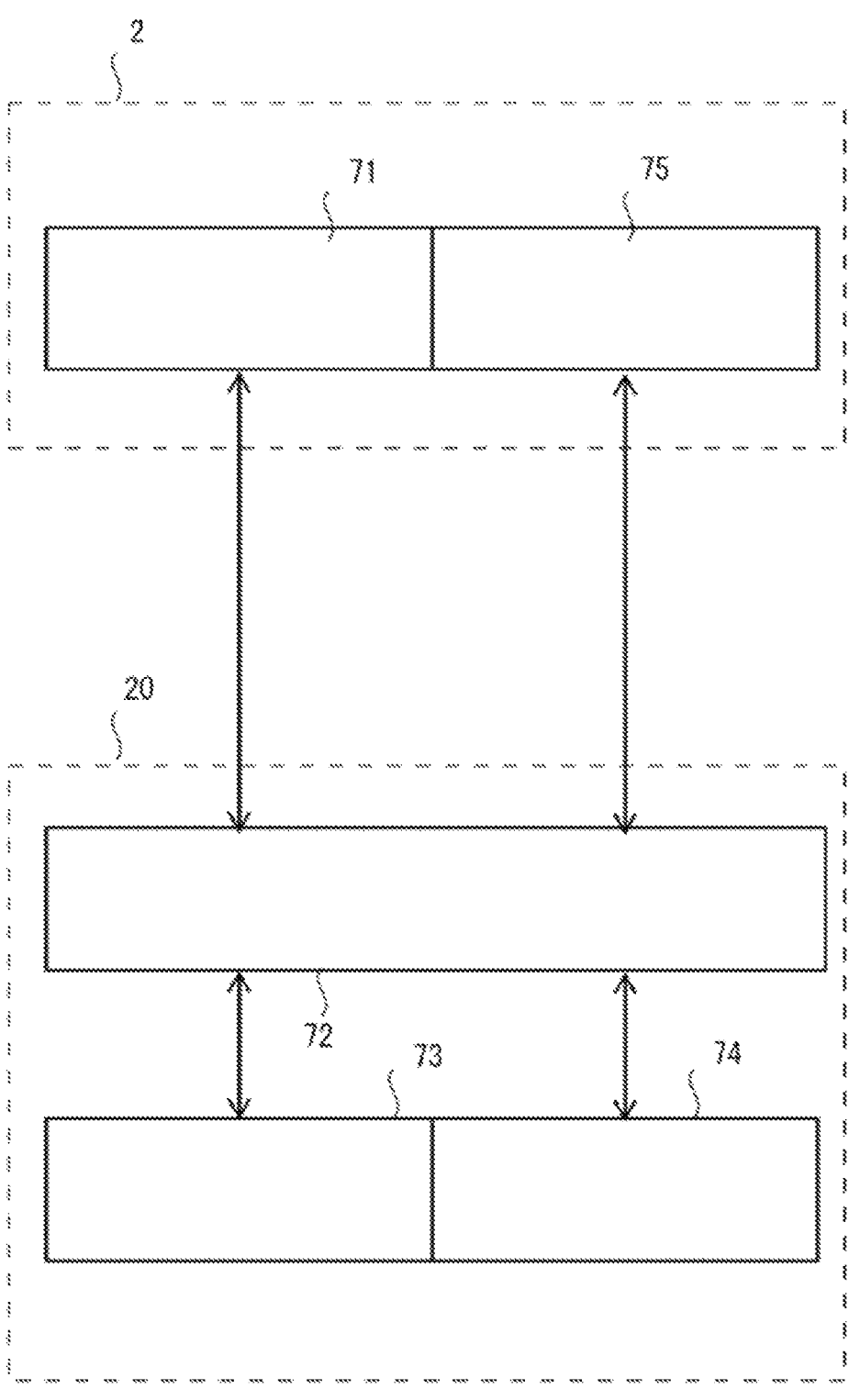
FIG. 14 is an explanatory diagram illustrating a case of applying the control according to one example embodiment described above to cooperation between an OTA center and an OTA master.

FIG. 14 is an explanatory diagram illustrating a case of applying the control according to the example embodiment described above to cooperation between an over-the-air (OTA) center 71 and an OTA master 72.

In FIG. 14, the server 2 may include the OTA center 71 and a back-end 75.

The vehicle 4 may include the OTA master 72, the DMS 73, and the head unit 74.

The OTA center 71 and the OTA master 72 may cooperate with each other to perform a control of downloading the update software in the database 3 coupled to the server 2, from the server 2 to the vehicle 4.

In this case, the OTA master 72 of the vehicle 4 may perform, for example, the software update control in FIG. 5, to perform a control of downloading the update software from the server 2 and developing and activating the update software.

When the OTA center 71 and the OTA master 72 are thus used to perform the series of processes described in detail in the example embodiment, the OTA master 72 of the vehicle 4 may perform the approval control in FIGS. 6 to 8.

In addition, the OTA master 72 may, in step ST1 in FIG. 5, communicate with the OTA center 71 of the server 2, and check whether there is unapplied update software.

The OTA master 72 may perform the processes in, for example, steps ST44 and ST46 in FIG. 7, step ST25 in FIG.

6, and steps ST62 and ST64 in FIG. 8, by using a captured image of the occupant obtained by the DMS 73.

The OTA master 72 may display, for example, the advance guidance screen in step ST49 in FIG. 7 and the update guidance screen in step ST26 or step ST28 in FIG. 6 on the head unit 74.

As described above, in the example embodiment, the control system 20 may serve as the software update apparatus for the vehicle 4 to be applied to the vehicle 4 to update the software to be used in the vehicle 4. The control system 20 includes the update control device 27, the input and output control device 24, and the communication control device 25. The update control device 27 is configured to perform the process of updating the software of the vehicle 4. The input and output control device 24 is configured to control the output device provided in the vehicle 4. The communication control device 25 is configured to communicate with the administrator terminal (12) of the administrator of the vehicle 4. Before performing the process of updating the software of the vehicle 4, the CPU 53 of the update control device 27 performs the boarding determination process of determining whether the administrator of the vehicle 4 is on board the vehicle 4.

When the CPU 53 determines that the administrator is on board in the boarding determination process, the CPU 53 outputs, via the input and output control device 24, the guidance notification of the software update process for the vehicle 4 from the output device provided in the vehicle 4. In contrast, when the CPU 53 determines that the administrator is not on board in the boarding determination process, the CPU 53 outputs, via the communication control device 25, the guidance notification of the software update process for the vehicle 4 from the administrator terminal (12) of the administrator of the vehicle 4. After outputting the guidance notification of the software update process for the vehicle 4, the CPU 53 performs the process of updating the software of the vehicle 4.

Thus, for example, when the occupant other than the administrator is on board the vehicle 4, it is possible to refrain from outputting the guidance notification of the software update process for the vehicle 4 in the vehicle 4. It is possible to prevent the occupant other than the administrator of the vehicle 4 from updating the software of the vehicle 4. Moreover, in the example embodiment, when the occupant other than the administrator is on board the vehicle 4, the CPU 53 outputs the guidance notification of the software update process for the vehicle 4 to the administrator terminal (12) of the administrator of the vehicle 4, instead of stopping the notification of the update. Accordingly, when able to update the software of the vehicle 4, it is possible for the administrator of the vehicle 4 to receive the notification of the update, even when not using the vehicle 4, and immediately update the software of the vehicle 4.

The CPU 53 may perform the process of updating the software of the vehicle 4 when an approval is inputted by the administrator. The CPU 53 may interrupt the present process of updating the software of the vehicle 4 when no approval is inputted by the administrator.

Consequently, for example, a person other than the administrator is prevented from updating the software of the vehicle 4, making it possible for the administrator of the vehicle 4 to easily manage the vehicle 4. In addition, it is possible for the administrator of the vehicle 4 to grasp that the software of the vehicle 4 has been updated by receiving the notification. It is thus possible for the administrator of the vehicle 4 to easily distinguish between the vehicle 4 with updated software and the vehicle 4 with non-updated software, without performing specific confirmation work. This enables the administrator of the vehicle 4 to appropriately manage the update of the software of the vehicle 4.

For example, in some embodiments, the CPU 53 may basically divide the update of the software into multiple stages including the process of acquiring software for the updating by the vehicle 4, the process of developing the acquired software in the vehicle 4, and the process of switching to execution of the software developed in the vehicle 4. Before performing the process in each stage, the CPU 53 may output the guidance notification of the software update process for the vehicle 4. Thus, it becomes unnecessary to continuously perform these processes based on one approval. Shorter time is used for the software update process based on each approval. It is thus possible for the administrator to start traveling of the vehicle 4 after a short wait time, without waiting for the whole series of update processes all at once. This helps to prevent the CPU 53 according to some embodiments from inhibiting the use of the vehicle 4 to provide a notification for guidance on the software update process for the vehicle 4.

In some embodiments, when the CPU 53 determines that the administrator is on board the vehicle 4 in the boarding determination process, the CPU 53 may further perform the physical condition determination process of determining whether the physical condition of the administrator is favorable. When the CPU 53 determines that the physical condition of the administrator of the vehicle 4 is favorable in the physical condition determination process, the CPU 53 may output, via the input and output control device 24, the guidance notification of the software update process for the vehicle 4 from the output device provided in the vehicle 4. In contrast, when the CPU 53 determines that the physical condition of the administrator of the vehicle 4 is not favorable in the physical condition determination process, the CPU 53 may stop outputting the guidance notification of the software update process for the vehicle 4, and interrupt the present process of updating the software of the vehicle 4. In this case, the CPU 53 may output the guidance notification of the software update process for the vehicle 4 at a next timing.

Thus, for example, when the physical condition of the administrator of the vehicle 4 is poor, the CPU 53 may refrain from providing a notification for guidance on the software update process for the vehicle 4 to the administrator having the poor physical condition. This makes it possible to reduce a burden on the administrator having the poor physical condition. It is possible for the administrator to receive the guidance notification of the software update process for the vehicle 4 in a favorable physical condition state, and reliably grasp an update state of the software of the vehicle 4.

In some embodiments, it is thus possible for the administrator of the vehicle 4 to appropriately manage the update of the software of the vehicle 4.

In some embodiments, the input and output control device 24 provided in the vehicle 4 may control the output device and the input device provided in the vehicle 4. The CPU 53 may start to output the guidance notification of the software update process for the vehicle 4, via the input and output control device 24, and repeatedly perform the visual recognition determination process of determining whether the administrator on board the vehicle 4 has visually recognized the guidance notification that is displayed. When the CPU 53 determines that the administrator has visually recognized the guidance notification in the visual recognition determination process repeated during the outputting of the guidance notification, the CPU 53 may permit approval input by the administrator via the input device, even before ending the outputting of the guidance notification. When an approval is inputted by the administrator via the input device, the CPU 53 may perform the process of updating the software of the vehicle 4.

Thus, upon visually recognizing the guidance notification of the software update process for the vehicle 4, it is possible for the administrator to input an approval via the input device, without waiting for the end of the guidance notification. When an approval is inputted by the administrator via the input device, it is possible for the input and output control device 24 to perform the process of updating the software of the vehicle 4. It is thus possible for the administrator to perform approval input and start traveling of the vehicle 4, for example, without keeping waiting for the end of the guidance notification. This helps to prevent the CPU 53 according to some embodiments from inhibiting the use of the vehicle 4 to provide a notification for guidance on the software update process for the vehicle 4.

In some embodiments, the output device may include the display device 38 configured to output a notification by displaying the notification. In the visual recognition determination process performed after starting to output the guidance notification of the software update process for the vehicle 4 from the display device 38, the CPU 53 may determine whether the occupant of the vehicle 4 has visually recognized the guidance notification, based on the viewing period during which the occupant of the vehicle 4 views the guidance notification displayed on the display device 38.

Further, the CPU 53 may perform the boarding re-determination process of determining again whether the administrator is on board the vehicle 4 even at present when the CPU 53 is providing the guidance notification. When the CPU 53 does not determine that the administrator is on board even at present when the CPU 53 is providing the guidance notification in the boarding re-determination process, the CPU 53 may stop outputting the guidance notification of the software update process for the vehicle 4, and interrupt the present process of updating the software of the vehicle 4.

It seems to be desired to basically perform the software update process for the vehicle 4 in a state in which the vehicle 4 is not traveling. Accordingly, a certain time period can elapse from a timing of first determining whether the administrator of the vehicle 4 is on board the vehicle 4 before the guidance notification, to a timing of permitting approval input after the guidance notification. There is a possibility that the occupant of the vehicle 4 has changed during this time period. In a case of such a change, if, for example, approval input by the administrator is permitted simply based on that the occupant of the vehicle 4 has visually recognized the guidance notification, the occupant of the vehicle 4 at the time of inputting an approval is no longer the administrator. The occupant other than the administrator is thus allowed to approve of the software update process for the vehicle 4. In some embodiments, even upon such time elapse, it is possible to accept an approval from the administrator.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

Each of the update control device 27, the input and output control device 24, and the communication control device 25 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the update control device 27, the input and output control device 24, and the communication control device 25. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the update control device 27, the input and output control device 24, and the communication control device 25 illustrated in FIG. 2.

The invention claimed is:

1. A vehicle software update apparatus to be applied to a vehicle, the vehicle software update apparatus comprising:
    an update control device configured to perform a process of updating software of the vehicle as a software update process;
    an input and output control device configured to control an output device provided in the vehicle; and
    a communication control device configured to communicate with a terminal device of an administrator of the vehicle, wherein
    the update control device is configured, before performing the process of updating the software of the vehicle, to:
        perform a boarding determination process of determining whether the administrator is on board the vehicle, wherein the update control device stores identification data for the administrator, and wherein the update control device is configured to: (i) extract features of an occupant of the vehicle from one or more in-vehicle sensors; (ii) compare the extracted features with the stored identification data; and (iii) when a coincidence level between the features and the identification data is greater than or equal to a threshold, determine that the occupant is the administrator;
        output, via the input and output control device, a guidance notification of the software update process for the vehicle from the output device provided in the vehicle, when the update control device determines that the administrator is on board in the boarding determination process; and
        output, via the communication control device, the guidance notification of the software update process for the vehicle to the terminal device of the administrator of the vehicle, when the update control device determines that the administrator is not on board in the boarding determination process; and perform the process of updating the software of the vehicle, after outputting the guidance notification of the software update process for the vehicle.

2. The vehicle software update apparatus according to claim 1, wherein the update control device is configured to:

perform a physical condition determination process of determining whether a physical condition of the administrator determined as being on board the vehicle in the boarding determination process is favorable;

output, via the input and output control device, the guidance notification of the software update process for the vehicle from the output device provided in the vehicle, when the update control device determines that the physical condition of the administrator of the vehicle is favorable in the physical condition determination process; and stop outputting the guidance notification of the software update process for the vehicle, and interrupt the process of updating the software of the vehicle, when the update control device determines that the physical condition of the administrator of the vehicle is not favorable in the physical condition determination process.

3. The vehicle software update apparatus according to claim 1, wherein the input and output control device is configured to control the output device and an input device provided in the vehicle, and the update control device is configured to:

start to output the guidance notification of the software update process for the vehicle, via the input and output control device, and repeatedly perform a visual recognition determination process of determining whether the administrator on board the vehicle has recognized the guidance notification that is displayed;

permit approval input by the administrator via the input device, even before the update control device ends outputting of the guidance notification, when the update control device determines that the administrator has visually recognized the guidance notification in the visual recognition determination process repeated during the outputting of the guidance notification; and perform the process of updating the software of the vehicle, when an approval is inputted by the administrator via the input device.

4. The vehicle software update apparatus according to claim 2, wherein the input and output control device is configured to control the output device and an input device provided in the vehicle, and the update control device is configured to;

start to output the guidance notification of the software update process for the vehicle, via the input and output control device, and repeatedly perform a visual recognition determination process of determining whether the administrator on board the vehicle has recognized the guidance notification that is displayed;

permit approval input by the administrator via the input device, even before the update control device ends outputting of the guidance notification, when the update control device determines that the administrator has visually recognized the guidance notification in the visual recognition determination process repeated during the outputting of the guidance notification; and perform the process of updating the software of the vehicle, when an approval is inputted by the administrator via the input device.

5. The vehicle software update apparatus according to claim 3, wherein the output device comprises a display device configured to display the guidance notification, and the update control device is configured to, in the visual recognition determination process performed after starting to output the guidance notification of the software update process for the vehicle from the display device, determine whether an occupant of the vehicle has visually recognized the guidance notification, based on a viewing period during which the occupant of the vehicle views the guidance notification displayed on the display device.

6. The vehicle software update apparatus according to claim 4, wherein the output device comprises a display device configured to display the guidance notification, and the update control device is configured to, in the visual recognition determination process performed after starting to output the guidance notification of the software update process for the vehicle from the display device, determine whether an occupant of the vehicle has visually recognized the guidance notification, based on a viewing period during which the occupant of the vehicle views the guidance notification displayed on the display device.

7. The vehicle software update apparatus according to claim 5, wherein the update control device is configured to perform a boarding re-determination process of determining again whether the administrator is on board the vehicle, permit approval input by the administrator, when the update control device determines that the administrator is on board in the boarding re-determination process, and stop outputting the guidance notification of the software update process for the vehicle, and interrupt the process of updating the software of the vehicle, when the update control device determines that the administrator is not on board in the boarding re-determination process.

8. The vehicle software update apparatus according to claim 6, wherein the update control device is configured to perform a boarding re-determination process of determining again whether the administrator is on board the vehicle, permit approval input by the administrator, when the update control device determines that the administrator is on board in the boarding re-determination process, and stop outputting the guidance notification of the software update process for the vehicle, and interrupt the process of updating the software of the vehicle, when the update control device determines that the administrator is not on board in the boarding re-determination process.

9. The vehicle software update apparatus according to claim 7, wherein the update control device is configured to perform the process of updating the software of the vehicle, when an approval is inputted by the administrator, and interrupt the process of updating the software of the vehicle, when no approval is inputted by the administrator.

10. The vehicle software update apparatus according to claim 8, wherein the update control device is configured to
    perform the process of updating the software of the vehicle, when an approval is inputted by the administrator, and
    interrupt the process of updating the software of the vehicle, when no approval is inputted by the administrator.

11. The vehicle software update apparatus according to claim 9, wherein the update control device is configured to
    divide the process of updating the software of the vehicle into multiple stages comprising
        a process of acquiring software for the updating by the vehicle,
        a process of developing the software acquired by the vehicle in the vehicle, and
        a process of switching to execution of the software developed in the vehicle, and
    output the guidance notification of the software update process for the vehicle, before performing the process in each of the stages.

12. The vehicle software update apparatus according to claim 10, wherein the update control device is configured to
    divide the process of updating the software of the vehicle into multiple stages comprising
        a process of acquiring software for the updating by the vehicle,
        a process of developing the software acquired by the vehicle in the vehicle, and
        a process of switching to execution of the software developed in the vehicle, and
    output the guidance notification of the software update process for the vehicle, before performing the process in each of the stages.

13. A vehicle software update apparatus to be applied to a vehicle, the vehicle software update apparatus comprising:
    first circuitry configured to perform a process of updating software of the vehicle as a software update process;
    second circuitry configured to control an output device provided in the vehicle; and
    third circuitry configured to communicate with a terminal device of an administrator of the vehicle, wherein
    the first circuitry is configured, before performing the process of updating the software of the vehicle, to:
        perform a boarding determination process of determining whether the administrator is on board the vehicle, wherein the first circuitry stores identification data for the administrator, and wherein the first circuitry is configured to: (i) extract features of an occupant of the vehicle from one or more in-vehicle sensors; (ii) compare the extracted features with the stored identification data; and (iii) when a coincidence level between the features and the identification data is greater than or equal to a threshold, determine that the occupant is the administrator;
        output, via the second circuitry, a guidance notification of the software update process for the vehicle from the output device provided in the vehicle, when the first circuitry determines that the administrator is on board in the boarding determination process; and
        output, via the third circuitry, the guidance notification of the software update process for the vehicle from the terminal device of the administrator of the vehicle, when the first circuitry determines that the administrator is not on board in the boarding determination process and
        perform the process of updating the software of the vehicle, after outputting the guidance notification of the software update process for the vehicle.

14. The vehicle software update apparatus according to claim 1, wherein
    the administrator is identified based on the identification data for the administrator including biometric information or based on a registered terminal device of the administrator, and
    the guidance notification includes information indicating contents of the software update process for the vehicle and options to approve or disapprove performing the software update process.

15. The vehicle software update apparatus according to claim 1, wherein the boarding determination process comprises:
    capturing an image of an occupant seated in the vehicle;
    extracting the features of the occupant from the captured image;
    comparing the extracted features with the identification data stored in a memory; and
    determining that the administrator is on board the vehicle when the coincident level between the extracted features and the identification data is greater than or equal to a threshold.

16. A vehicle software update apparatus to be applied to a vehicle, the vehicle software update apparatus comprising:
    an update control device configured to perform a process of updating software of the vehicle as a software update process;
    an input and output control device configured to control an output device provided in the vehicle; and
    a communication control device configured to communicate with a terminal device of an administrator of the vehicle, wherein
    the update control device is configured to switch destination to be output a guidance notification of the software update process based on a location of the administrator, and output the guidance notification before performing the process of updating the software of the vehicle, and
    the update control device is configured, before performing the process of updating the software of the vehicle, to:
        perform a boarding determination process of determining whether the administrator is on board the vehicle;
        output, via the input and output control device, the guidance notification of the software update process for the vehicle to the output device provided in the vehicle and display the guidance notification by using the output device, when the update control device determines that the administrator is on board in the boarding determination process; and
        output, via the communication control device, the guidance notification of the software update process for the vehicle to the terminal device of the administrator of the vehicle and display the guidance notification by using the terminal device, when the update control device determines that the administrator is not on board in the boarding determination process; and
        perform the process of updating the software of the vehicle, after outputting the guidance notification of the software update process for the vehicle.

* * * * *